(12) United States Patent
Arkeketa et al.

(10) Patent No.: US 6,519,637 B1
(45) Date of Patent: Feb. 11, 2003

(54) METHOD AND APPARATUS FOR MANAGING A MEMORY SHORTAGE SITUATION IN A DATA PROCESSING SYSTEM

(75) Inventors: Woodrow Wyatt Arkeketa, Austin, TX (US); Richard Jay Cohen, Austin, TX (US); Umesh Khatwani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,276

(22) Filed: Sep. 23, 1999

(51) Int. Cl.$^7$ ............................................. G06F 15/173
(52) U.S. Cl. .................. 709/223; 709/224; 709/226; 709/229; 709/248
(58) Field of Search ................. 709/224, 223, 709/226, 229, 232, 235, 210, 211, 248

(56) References Cited

U.S. PATENT DOCUMENTS

| | | | |
|---|---|---|---|
| 5,218,680 A | 6/1993 | Farrell et al. ................ 395/325 |
| 5,265,248 A | 11/1993 | Moulios et al. ............. 395/650 |
| 5,394,549 A | 2/1995 | Stringfellow et al. .... 364/261.5 |
| 5,655,081 A | 8/1997 | Bonnell et al. ........ 395/200.32 |
| 5,724,536 A | 3/1998 | Abramson et al. .......... 395/392 |
| 5,862,333 A | * 1/1999 | Graf ........................... 709/223 |
| 5,892,812 A | * 4/1999 | Pester, III .................... 379/34 |
| 5,893,083 A | 4/1999 | Eshghi et al. ................. 706/45 |

* cited by examiner

Primary Examiner—Ario Etienne
(74) Attorney, Agent, or Firm—Duke W. Yee; Jeffrey S. LaBaw; Stephen R. Tkacs

(57) ABSTRACT

A method and apparatus in a distributed data processing system for managing memory in a data processing system within the distributed data processing system. Responsive to detecting a first level of memory shortage on the data processing system, a first set of monitors is automatically stopped on the data processing system. Responsive to detecting a second level of memory shortage on the data processing system, a second set of monitors is stopped on the data processing system. Responsive to detecting a ceasing of the memory shortage, all stopped monitors are automatically started.

44 Claims, 8 Drawing Sheets

DCE MONITORS AND TASKS

STATISTICAL MONITORS

| | | |
|---|---|---|
| auditServerState | dtsState | |
| auditTrailSize | registryState | |
| cdsAttributes | serverListeningUUID | |
| cdsClerkCounter | serverStatistics | 500 |
| clearinghouseCounter | serverStatisticsUUID | |
| clearinghouseState | serverResponseTime | |
| dtsCounter | serverResponseTimeUUID | |

OTHER MONITORS

| | | |
|---|---|---|
| checkpointSpaceAvailable | dceServersUp | 502 |
| dceDiskSpaceUsedPct | svcLogSize | |

TASKS/AUTOMATED ACTIONS

| | | |
|---|---|---|
| RestartDCEServers | CleanUpCredentials | 504 |
| RemoveCoreFiles | RemoveSVCLogFiles | |

*FIG. 5*

DFS STATISTICAL MONITORS

| 600 | 602 |
|---|---|
| AGGREGATE PERCENTAGE | PERCENTAGE |
| AGGREGATE USED | COUNT (1K BLOCKS) |
| AUTHORIZATION CHECKING | STRING (ENABLED/DISABLED) |
| CACHE PERCENTAGE | PERCENTAGE |
| CACHE USED | COUNT (1K BLOCKS) |
| CELLS CONTACTED | COUNT |
| CURRENT PRINCIPLES | COUNT |
| FILE SERVER STATUS | STRING (UP/DOWN) |
| FILESET REPLICAS | COUNT |
| FILESET SERVER ACTIVITY | STRING (IDLE/BUSY) |
| FILESET STATUS | STRING (LOCKED/UNLOCKED) |
| LOCKED ENTRIES IN FILESET LOCATION DATABASE (FLDB) | COUNT (LOCKED FLDB ENTRIES) |
| NOT AVAILABLE SERVER | STRING(ALL RUNNING/NOT ALL RUNNING) |
| NUMBER OF FILESETS ON SERVER | COUNT |
| NUMBER OF REPLICAS ON SERVER | COUNT |
| PROCESS CORE FILE | STRING (EXISTS/DO NOT EXIST) |
| PROCESSES RUNNING | STRING (UP/DOWN) |
| PROCESS STATUS | STRING (STATUS STRING) |
| QUOTA PERCENTAGE | PERCENTAGE |
| QUOTA USED | COUNT (1K BLOCKS) |
| READS TO FILESET | COUNT (BYTES) |
| TOTAL CALLS | COUNT |
| TOTAL CLIENTS | COUNT |
| TOTAL FETCHES | COUNT |
| TOTAL FETCHED BYTES | COUNT (MEGABYTES) |
| TOTAL LOOKUPS | COUNT |
| TOTAL STORED BYTES | COUNT (MEGABYTES) |
| TOTAL STORES | COUNT |
| WRITES TO FILESET | COUNT (BYTES) |

*FIG. 6*

METHOD AND APPARATUS FOR MANAGING A MEMORY SHORTAGE SITUATION IN A DATA PROCESSING SYSTEM

BACKGROUND OF THE INVENTION

1. Technical Field

The present invention relates generally to an improved data processing system and in particular to a method and apparatus for managing a data processing system. Still more particularly, the present invention provides a method and apparatus for handling memory shortages in a data processing system.

2. Description of Related Art

Distributed computing involves the cooperation of two or more computers communicating over a network. These computers may range from personal computers to super computers. In a distributed computing environment, the network may connect machines located in a building or on different continents. With this type of cooperative computing, special function hardware or software may be made available over the network without having to duplicate this hardware or software on every node that requires access to this special function hardware or software. In addition, distributed computing allows many small workstations to work together rather than requiring a large workstation of equivalent power, which is often more expensive. For example, adding another small workstation to a distributed system can be faster and less expensive than bringing down a centralized system and replacing it with an upgraded system.

With these advantages in distributed computing, Open Software Foundation Distributed Computing Environment (DCE) has been provided as an industry standard set of computing technologies. DCE is able to run on all major computing platforms and is designed to support distributed applications in heterogeneous hardware and software environments. For example, DCE is available for use with Advanced Interactive Executive (AIX) operating system, which is available from International Business Machines Corporation. With DCE, a remote host may be monitored by an administrator to identify shortages in resources or to identify errors in execution, which may require intervention by the administrator.

Swap space is a virtual storage mechanism in which data in the main storage may be written to an auxiliary storage. The data may be written back into the main storage when needed. This mechanism typically involves a paging technique that writes active pages of a job to an auxiliary storage and reads pages of another job from the auxiliary storage into the main or real storage. In DCE, insufficient swap space on a machine may indicate that programs (e.g., resource monitors or tasks) on that machine may not complete. As a result, other processes running on the machine may contribute to the problem or may be unable to execute.

Therefore, it would be advantageous to have a method and apparatus to manage shortages of memory resources in a data processing system.

SUMMARY OF THE INVENTION

The present invention provides a method and apparatus in a distributed data processing system for managing memory in a data processing system within the distributed data processing system. Responsive to detecting a first level of memory shortage on the data processing system, a first set of monitors is automatically stopped on the data processing system. Responsive to detecting a second level of memory shortage on the data processing system, a second set of monitors is stopped on the data processing system. Responsive to detecting a ceasing of the memory shortage, all stopped monitors are automatically started. The present invention also provides for a method of controlling how the memory management capabilities are enabled and disabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating monitors and tasks depicted in accordance with a preferred embodiment of the present invention;

FIG. 6 is a diagram of distributed file system statistical monitors depicted in accordance with a preferred embodiment of the present invention;

DETAILED DESCRIPTION OF THE PREFERRED EMBODIMENT

Figure 1:
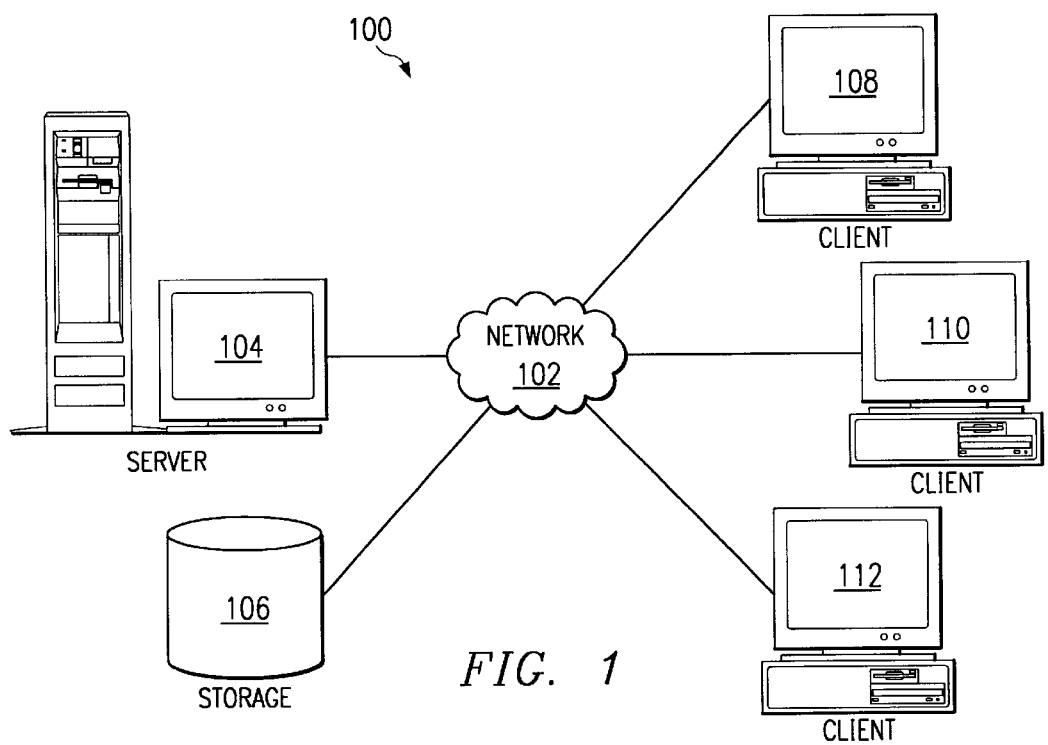
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to include additional servers, clients, and other devices not shown. A computing environment, such as DCE, may be implemented in distributed data processing system 100. Further, distributed data processing system 100 may be implemented as a number of different types of networks, such as for example, an intranet, a local area network (LAN), or a wide area network (WAN). FIG. 1 is intended as an example, and not as an architectural limitation for the present invention.

Figure 2:
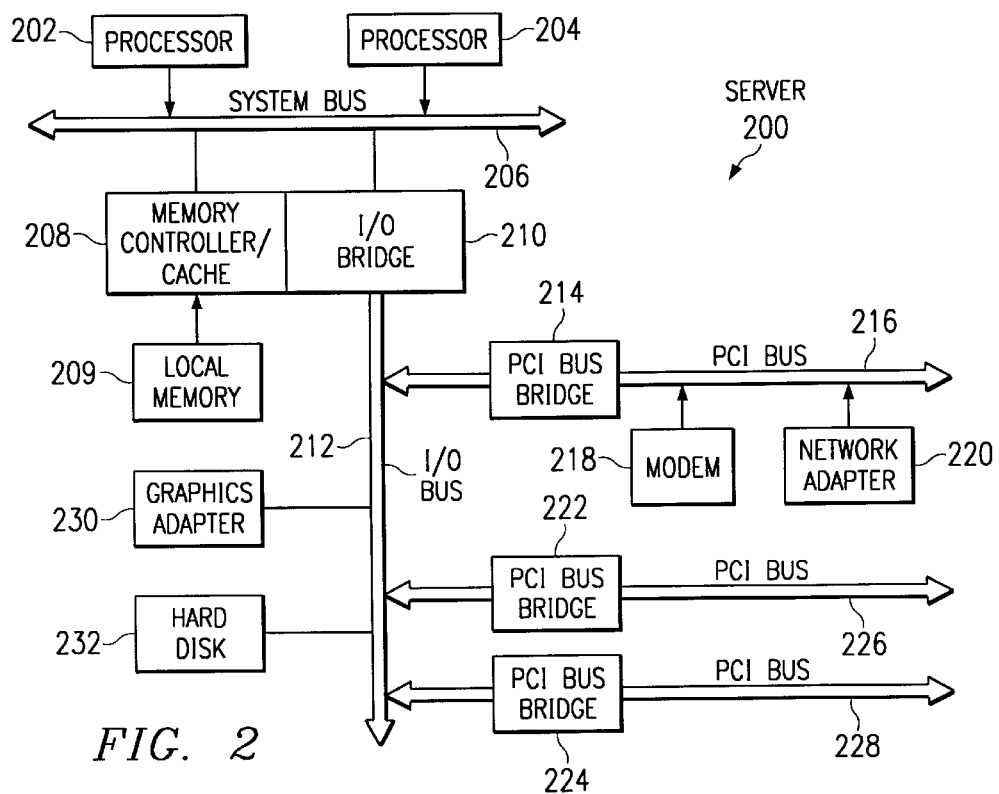
FIG. 2 is a block diagram that depicts a data processing system that may be implemented as a server depicted in accordance with a preferred embodiment of the present invention.

Referring to FIG. 2, a block diagram of a data processing system that may be implemented as a server, such as server 104 in FIG. 1, is illustrated in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
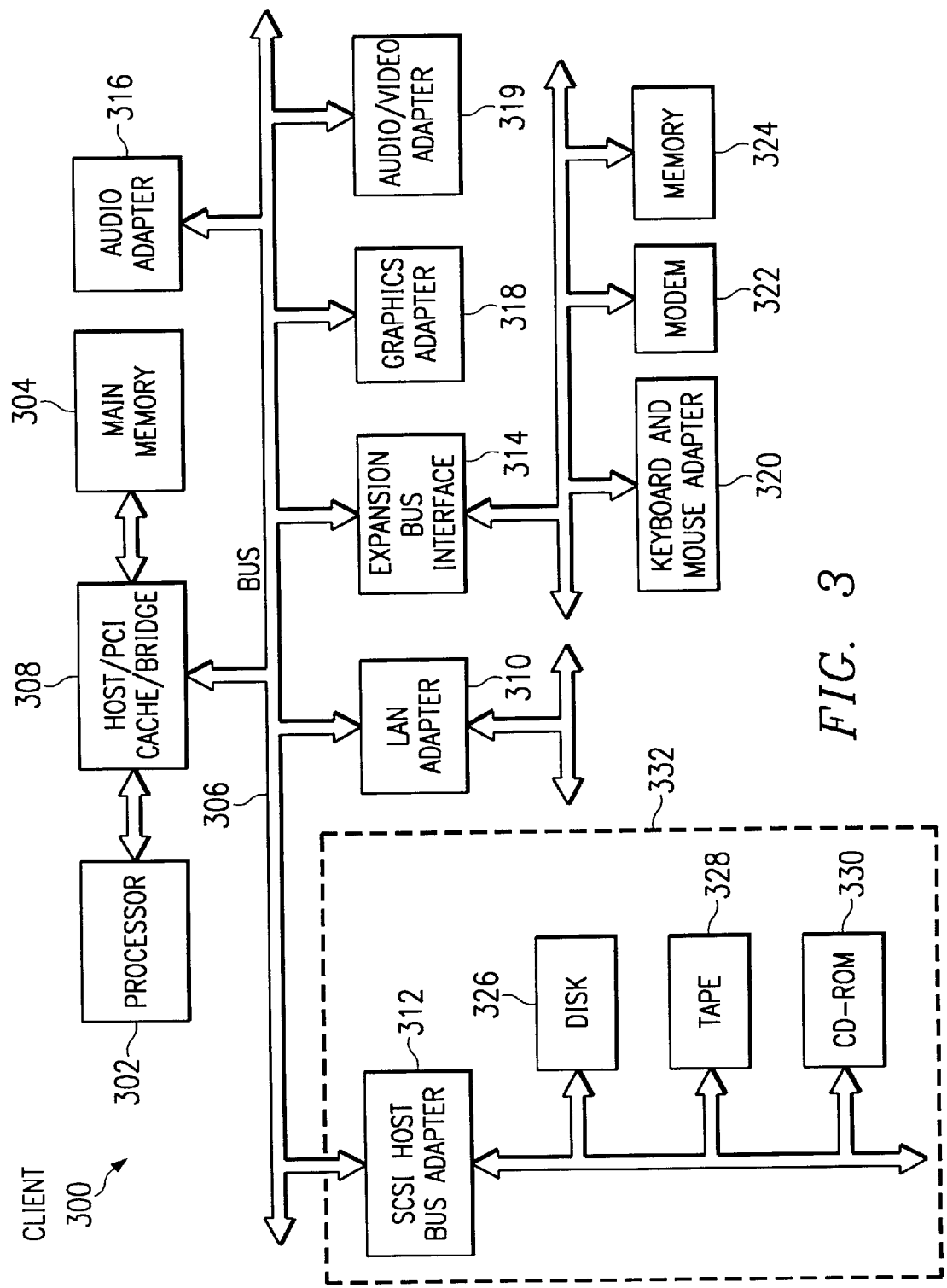
FIG. 3 is a block diagram that illustrates a data processing system that may be implemented as a client in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. The depicted example in FIG. 3 and above-described examples are not meant to imply architectural limitations. For example, data processing system 300 may also be a notebook computer.

The present invention provides a method, apparatus, and computer implemented instructions for handling a situation in which a shortage of memory exists in a data processing system. The mechanism of the present invention is illustrated with respect to shortages or insufficient swap space. Hosts within a distributed computing environment include a swap space shortage monitor, which issues a swap space shortage event when the swap space on a specific host is approaching a critical shortage. When this condition is encountered, starting new processes including new monitor processes on the host adds to the problem. The mechanism of the present invention correlates this event with other events from the same host to initiate automatic actions to stop certain processes, such as monitors. In particular, monitors, such as statistical monitors, which are not critical to keeping the system functional, are stopped in response to an event indicating a memory shortage in the host. In response to another event showing a continuation of the prior condition, other or all of these selected processes may be stopped. For example, in the case of monitors, all of the monitors may be stopped except for the swap space shortage monitor. In response to sufficient memory being available in the host, the stopped processes may be started.

The swap space shortage monitor may generate events for different levels of notification. For example, a swap space shortage event may be generated when a threshold of 80% of the available swap space has been used with another event being generated when a threshold of 90% of the available swap space has been used. These thresholds may be adjusted depending on the data processing system, the processes executing on the data processing system, and the availability requirements of the processes running on the data processing system.

Figure 4:
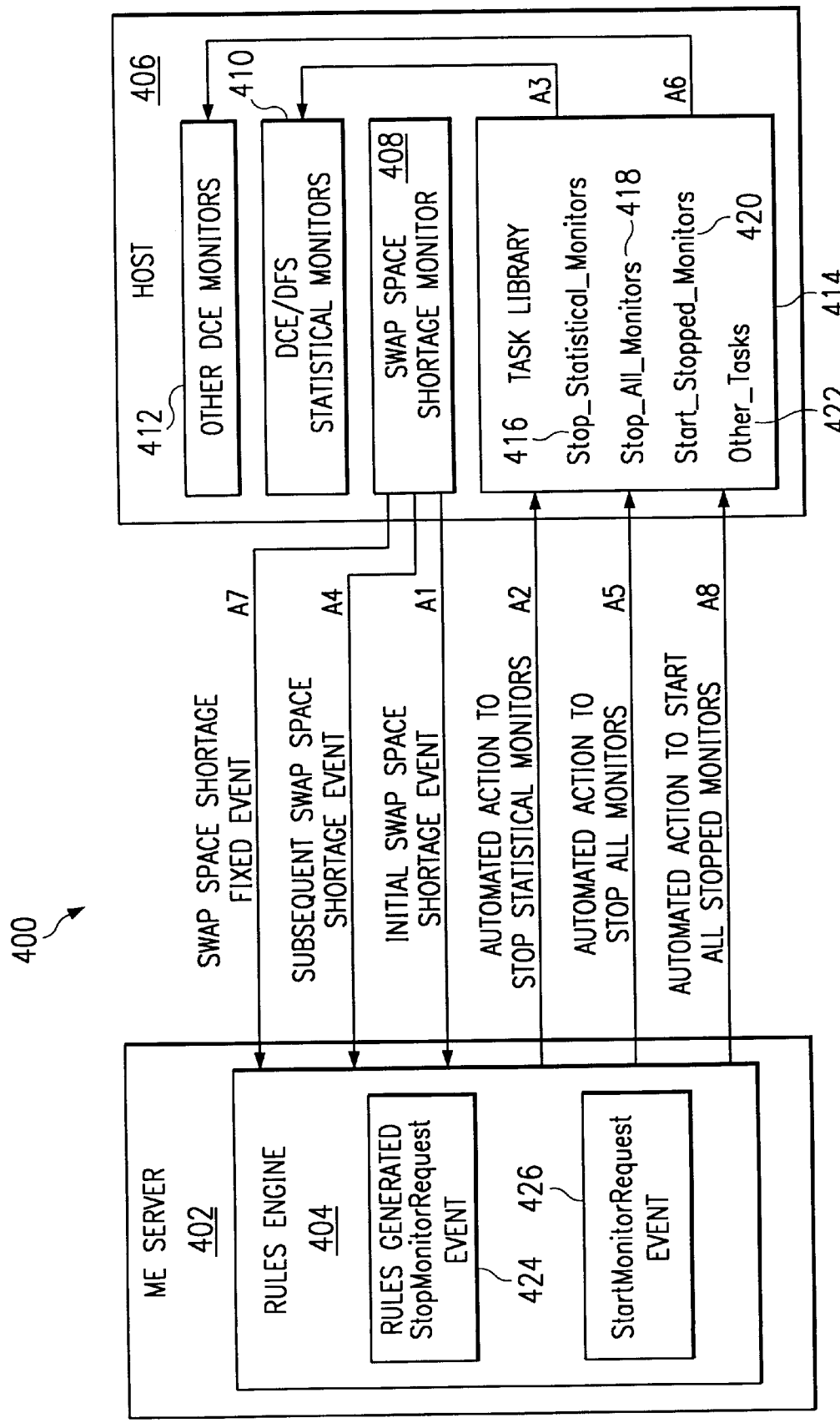
FIG. 4 is a block diagram illustrating control flow for managing memory shortages in a host depicted in accordance with a preferred embodiment of the present invention.

With reference now to FIG. 4, a block diagram illustrating control flow for managing memory shortages in a host is depicted in accordance with a preferred embodiment of the present invention. In this example, distributed computing environment 400 includes a management environment server 402, which is a data processing system configured to contain rules engine 404. Host 406 is a managed host in this example for which a number of monitors are defined. These monitors are configured to perform a function, such as, for example, monitoring availability of memory or swap space (or gathering performance or system usage statistics). These monitors may generate an event. An event is a definition of a specific condition that can occur on a managed host and be reported to the management environment rules engine. In turn, the rules engine will process the event.

In this example, host 406 includes a swap space shortage monitor 408, which is employed to monitor available swap space on host 406. Host 406 also contains statistical monitors 410 and other monitors 412. In addition, a task library 414 is present within the scope of the management environment and may reside within host 406. Task library 414 contains a collection of management environment tasks. These tasks may be executed by an administrator to perform a specific task. In this example, the collection of management environment tasks in task library 414 include Stop_Statistical_Monitors 416, Stop_All_Monitors 418, and Start_Stopped_Monitors 420. Task library 414 also contains Other_Tasks 422. Other_Tasks 422 are tasks that may be defined for other specific purposes. These tasks are known DCE tasks and may be, for example, RestartDCEServers, RemoveCoreFiles, CleanUpCredentials, or RemoveSVCLogFiles.

Swap space shortage monitor 408 will generate an initial swap space shortage event when swap space usage at host 406 reaches some predetermined level (step A1). This level may be set by an administrator and may be, for example, when 80% of the available swap space has been used. This event is received at server 402 and processed by rules engine 404. In these examples, monitors generate events, which contain information, such as an indication that the state of a resource has changed. This initial swap space shortage event causes generation of a stop monitor request event 424 within rules engine 404. This event will include a number of attributes including a stop_all attribute, which is set equal to false in this example. This setting indicates that only statistical monitors should be stopped. The presence of an active swap space shortage event causes all other automated actions to be disabled for rule sets that correlate the event, but not those associated with the StopMonitorRequest event.

Rules engine 404 has an active rule base which is a collection of rule sets. Each rule set is a collection of rules. Each rule in a rule set operates on one or more event classes. For example, a swap space shortage event class is handled by a handle swap space shortage event rule in the depicted examples. Each rule includes a section identifying the event classes that will be processed by the rule and an action section to indicate the processing that takes place for a particular event. Before an automated action is attempted, a check is made to see if an active swap space shortage event is present for that host. If an active swap space shortage is present, then the automated action does not occur.

When rules engine 404 receives a stop monitor request event, an automated action to stop statistical monitors is initiated on host 406 (step A2). This automated action is initiated on task Stop_Statistical_Monitors 416 in task library 414. This task will stop running statistical monitors 410 (step A3).

When swap space monitor 408 detects a more severe swap space shortage, another swap space shortage event is sent (step A4). In the depicted examples, this event is a more severe swap space shortage event and is generated when a second threshold is reached. The threshold may be, for example, use of 90% of the available swap space. This event causes a stop monitor request event 424 to be generated in which the stop_all attribute is set equal to true.

The implementation in the depicted examples also takes into consideration other thresholds, such as, for example, going from 79% to 90% and back to 80%. This scenario would produce a less severe event and the results would be the same as going from 79% to 81% to 90%. It is the change to a different threshold (i.e. response level) for the event that is of importance as to the severity of the event. Rules engine 404 processes the new stop monitor request event and initiates an automated action to stop all monitors on host 406 (step A5) This automated action initiates Stop_All_Monitors 418 in task library 414 and causes all other monitors 412 to be stopped (step A6).

When the swap space shortage problem ends, a swap space shortage fixed event is generated by swap space shortage monitor 408 (step A7). This event may be generated in response to various actions, causing the memory shortage to be alleviated. For example, the swap space shortage problem may be fixed by an administrator or as a result of an automated action occurring in the rules. The problem also may be fixed by a process on the host releasing resources after finishing a function. This event is received by rules engine 404 in server 402. The swap space shortage fixed event causes any active stop monitor request event 424 for that host to be closed. Part of the processing of this event causes rules engine 404 to generate StartMonitorRequest event 426 for the associated host. The processing of the StartMonitorRequest event will initiate an automated action to start the stopped monitors after a time delay (step A8). This automated action initiates Start_Stopped_Monitors 420 in task library 414, which restarts the monitors within the scope of the start task on host 406.

The stopping of monitors allows memory resources to be made available within host 406. Additionally, other automated actions are prevented from initiating new processes within host 406 to prevent additional usage of memory resources. These actions allow current processes within host 406 to finish tasks and free up memory resources. If memory resources are not freed up, the monitors will not be restarted and the administrator will need to fix the problem manually by rebooting the host 406, fix the shortage by stopping other unnecessary applications running on the host, or add additional resources to host 406.

With reference now to FIG. 5, a diagram illustrating monitors and tasks is depicted in accordance with a preferred embodiment of the present invention. Section 500 illustrates examples of DCE statistical monitors that may execute on a host, such as host 406 in FIG. 4. Section 502 shows other monitors, which are non-statistical monitors. Section 504 illustrates some examples of the tasks that may be located in task library 414 in other tasks 422 in FIG. 4. The monitors and tasks illustrated in FIG. 5 are meant to be examples and not to limit the present invention. For example, the processes of the present invention may be applied to other types of monitors such as those in a distributed file system (DFS).

Turning next to FIG. 6, a diagram of distributed file system statistical monitors is depicted in accordance with a preferred embodiment of the present invention. These statistical monitors are examples of monitors other than DCE monitors that may be stopped and started using the processes of the present invention. Section 600 illustrates the names of the monitors, which are associated with an implied resource, while section 602 shows the output for the managed resource generated by the monitors.

Figure 7:
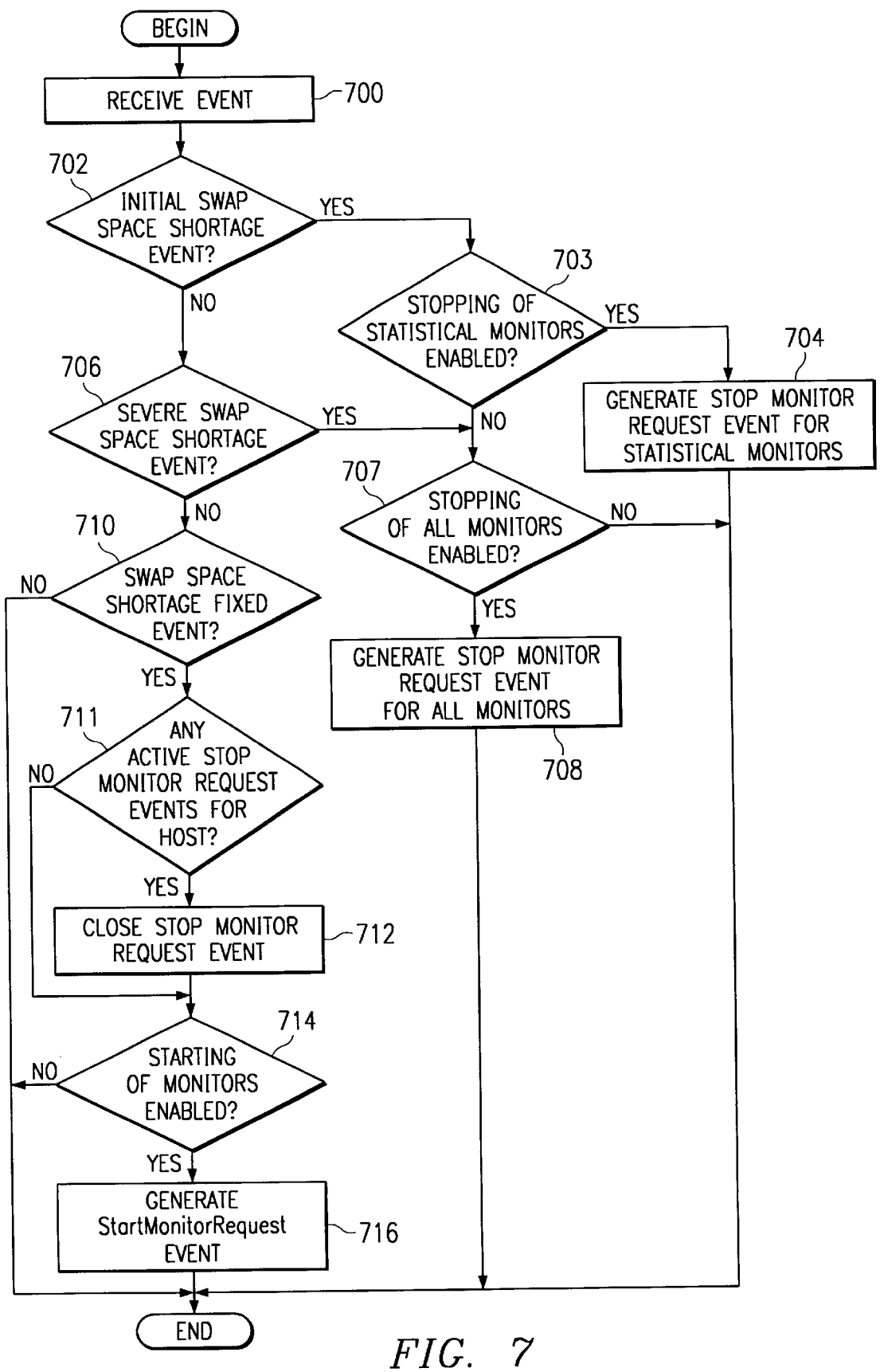
FIG. 7 is a flowchart of a process for processing swap space shortage events depicted in accordance with a preferred embodiment of the present invention.

Referring to FIG. 7, a flowchart of a process for processing swap space events is depicted in accordance with a preferred embodiment of the present invention. The process begins by receiving an event (step 700). This event is received at a server from a host and is processed by a rules engine, such as rules engine 404 in FIG. 4. A determination is then made as to whether the event is an initial swap space shortage event (step 702). If the event is an initial swap space shortage event, a determination is then made as to whether stopping of statistical monitors has been enabled (step 703). If the stopping of statistical monitors has been enabled, a stop monitor request event is generated that will cause the statistical monitors to be stopped (step 704) and the process terminates.

With reference again to step 702, if the event received by the rules engine is not an initial swap space event, a determination is then made as to whether a more severe swap shortage event has been received (step 706). If a more severe swap shortage event has been received, another check is made to see if stopping all monitors has been enabled (step 707). If it has, a stop monitor request event is generated that will cause all monitors to be stopped (step 708) and the process terminates. If the stopping of all monitors has not been enabled in step 707, the stop monitor event is not generated and the process terminates.

Turning again to step 703, if the stopping of statistical monitors is not enabled, the process proceeds to step 707 as described above.

With reference again to step 706, if the event is not a more severe swap space shortage event, a determination is then made as to whether the event is a swap space shortage fixed event (step 710). If the event is a swap space shortage fixed event, another check is made to see if there are any active stop monitor request events for the associated host (step 711). If active stop monitor request events are present, they are closed (step 712). If no events are present to close, another check is made to see if starting monitors has been enabled (step 714). This check is also made after closing any stop monitor request events in step 712. If the starting of monitors is enabled, a start monitor request event is generated (step 716) with the process terminating thereafter. Turning back to step 714, if the starting of monitors is not enabled, the process also terminates.

Figure 8:
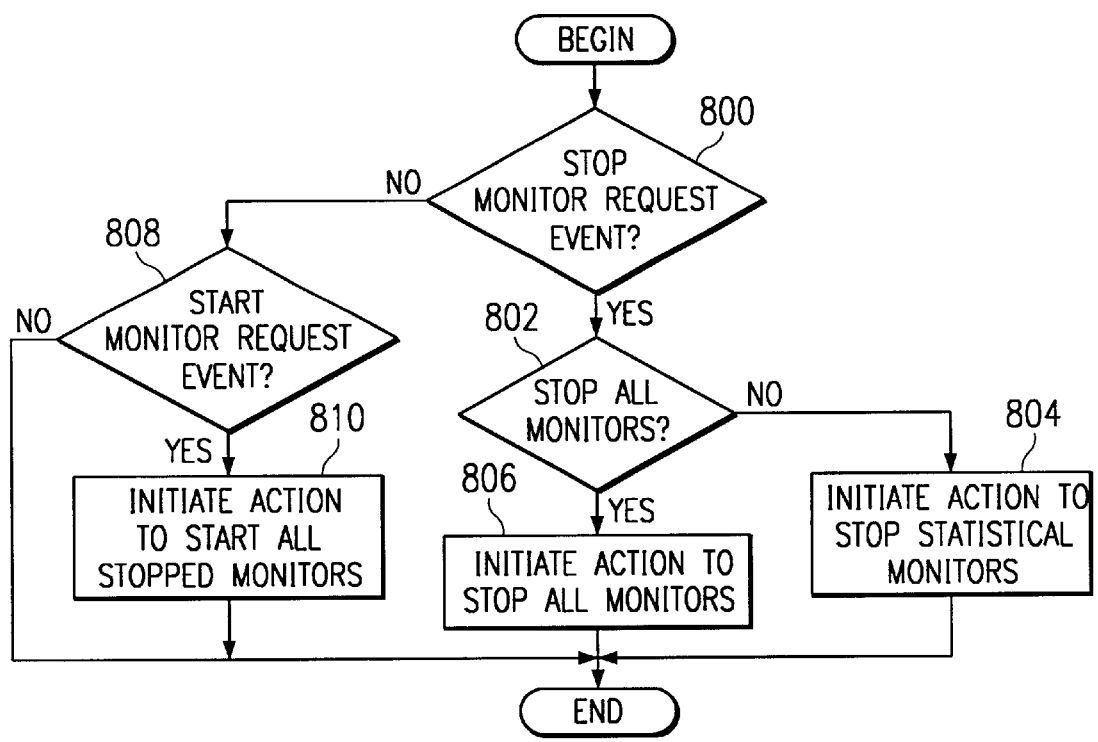
FIG. 8 is a flowchart of a process for processing the stop and start monitor request events for a host in response to changes in availability of memory resources depicted in accordance with a preferred embodiment of the present invention.

Turning next to FIG. 8, a flowchart of a process for processing the stop and start monitor request events for a managed host in response to changes in availability of memory resources is depicted in accordance with a preferred embodiment of the present invention. The process begins by determining whether a stop monitor request event is present in the rules engine (step 800). If a stop monitor request event is present, an attribute of the event indicates the action that is needed. A determination is then made as to whether to stop all monitors (step 802). If the stop_all attribute is false, action is initiated to stop statistical monitors on the associated host (step 804) with the process terminating thereafter. If the stop_all attribute is true, action is initiated to stop all monitors (step 806) on the associated host with the process terminating thereafter. With reference again to step 800, if a stop monitor request event is absent in the rules engine, a determination is then made as to whether a start monitor request event is present (step 808). If a start monitor request event is present, an action to start all stopped monitors is initiated (step 810) with the process terminating thereafter. If a start monitor request event is not present is step 808, the process terminates.

Further, a mechanism is provided to allow an administrator to control whether the stopping and starting of monitors will be allowed by the rules engine. In the depicted examples, an executable command is provided to allow an administrator to issue the EnableMonitorStopStart event. The control provided by this event is taken into account in steps 703, 707, and 714 in FIG. 7. This event has several main attributes as well as others common to all events. One of the attributes is for enabling the stopping of monitors, another is for enabling the starting of monitors, and the remainder deal with identifying the files that will hold the monitor names to be stopped and started. For example, an EnableMonitorStopStart event may enable only the stopping of statistical monitors. This feature may be enabled by setting the attribute, stop_value, to 1 and setting the attribute, stop_files_set1, to the path and file name of a file containing the names of the statistical monitors to be stopped. Another feature is the enabling of stopping of all monitors. This feature is enabled in exactly the same way as for "statistical only". The file containing the monitors to stop is just more encompassing and may also include the statistical monitors. Setting the attribute, stop_all, to 2 allows the administrator to break the stopping of monitors down into 2 groupings (e.g., statistical and all others). In this case, the attributes, stop_files_set1 and stop_files_set2, would be utilized.

This event also allows the enabling of actions to start stopped monitors. This feature is enabled by setting the attribute, timer_value, to a value greater than zero. Enablement of this feature enables a timer to allow stopped monitors to be restarted after a set amount of time after a swap space shortage fixed event is received. A value of less than 1 disables the starting of stopped monitors. In the depicted examples, the default is zero.

The attribute, start_file, is used to identify a file and its location that will contain the names of the monitors to be stopped. This file will have a file extension that is the same as the managed host name since starting of monitors is dependent on those that were stopped for a specific managed host.

When an active swap space shortage event exists for the host disabling of automated actions occur. When there is no longer an active swap space shortage event, the enabling of automated actions resumes. This is done by correlating the active swap space shortage events with any rules that initiate an automatic action. When there is an active one, automatic actions are disabled and not enabled until a swap space shortage fixed event is processed.

Figure 9:
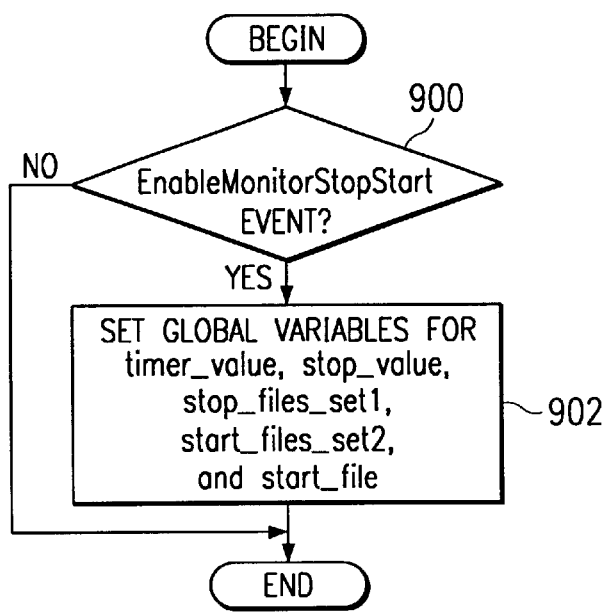
FIG. 9 is a flowchart of a process for enabling and disabling the functionality for all managed hosts in response to changes in availability of memory resources depicted in accordance with a preferred embodiment of the present invention.

With reference now to FIG. 9, a flowchart of a process for enabling and disabling the functionality for all managed hosts in response to stopping and starting monitors is depicted in accordance with a preferred embodiment of the present invention. The process begins by checking for a presence of an EnableMonitorStartStop event (step 900). If the event is present, global variables for the stop value, timer value, stop files set1, stop files set2, and start file are set using the values obtained from the corresponding event attributes (step 902) with the process terminating thereafter. If an event is not present in step 900, the process terminates. Global variables are available to all actions in the rule base.

The event's timer_value attribute is used to set a global variable maintained in the rules engine. This variable will contain 0 if the starting of monitors is disabled; otherwise, it will contain a timer value greater than zero. The value represents a time interval in minutes to wait after receiving the swap space shortage fixed event before attempting to restart any monitors. The event's stop_value attribute is used to set a global variable maintained in the rules engine. This variable identifies the number of files that will contain monitor names to stop. The variable will contain 0, 1, or 2. The default setting is 0 and is used to indicate that stopping of monitors is disabled. A value of 1 is used to indicate that only one list of monitors is available to be stopped. The list may contain just the statistical monitors that are to be stopped or it may contain all monitors that are to be stopped, optionally, including the statistical monitors. The stop monitor and start monitor tasks described above will be activated using shell scripts. The shell script to activate a task can read a file for stopping the first set of monitors and a second file for the second set (stop_value=2). In the depicted example, in which only one set of monitors are being stopped, one file is sufficient (stop_value=1). The names of these files may be entered as part of the EnableMonitorStopStart event as another set of attributes (e.g., stop_files_set1=/opt/dcelocal/etc/stop1.files, stop_files_set2=/opt/dcelocal/etc/stop2.files, and start_file=/opt/dcelocal/etc/start).

A list monitor command will be used to determine the list of monitors that are enabled for a specific managed host. As a monitor name is read in and it has been determined that it is enabled for the specific host, another command is used to send the disable request to the managed host where the monitor is stopped and disabled. The monitor name for every monitor that is disabled and stopped in this manner for the managed host is written to the file, <start_file>.<hostname>. The portion of the filename, <start_file>, is the path and file name obtained from the EnableMonitorStopStart event's global setting and the filename extension, <hostname>, is the name of the managed host. When monitors are started, the <start_file>.<hostname>file is read to determine which monitors to start. If the start file is not found, no monitors are started. The starting will involve executing another command to send the enable request to the corresponding managed host where the monitor will be enabled and started.

Figure 10:
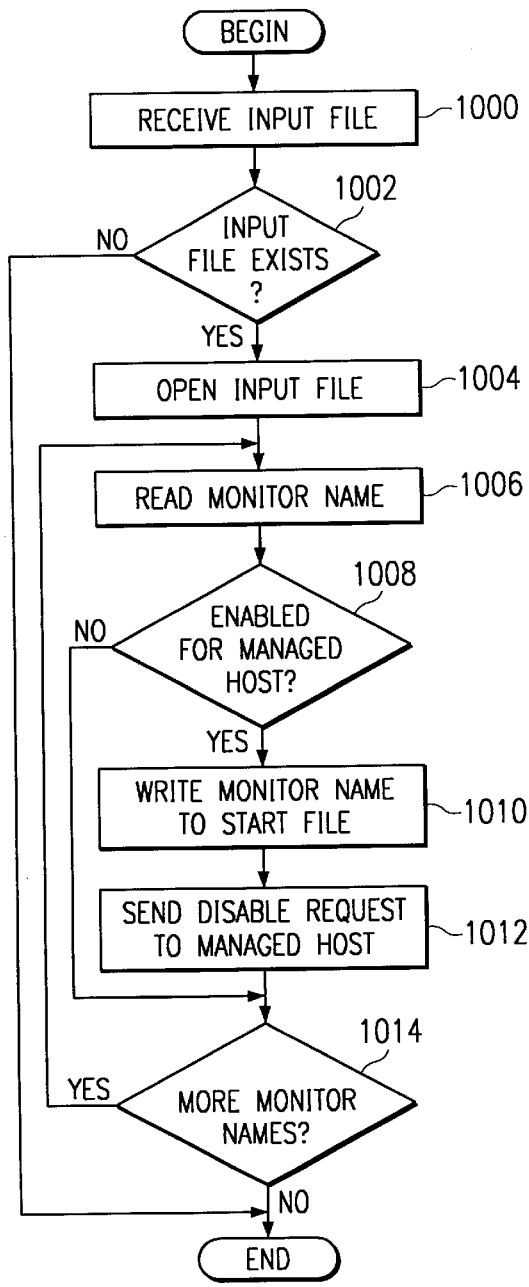
FIG. 10 is a flowchart of a process for a task to stop monitors depicted in accordance with a preferred embodiment of the present invention.

With reference now to FIG. 10, a flowchart of a process for a task to stop monitors is depicted in accordance with a preferred embodiment of the present invention. The process begins by receiving an identification of an input file (step 1000). A determination is made as to whether an input file exists (step 1002). If an input file exists, the input file is opened (step 1004). A monitor name is read (step 1006). This step reads monitor names that have not yet been processed. A determination is then made as to whether the monitor name is for a monitor that is enabled for the managed host in question (step 1008). If the monitor is enabled, the monitor name is written to a start file (step 1010). A disable request is sent to the managed host where the monitor is stopped and disabled (step 1012). A determination is made as to whether additional monitor names are present in the input file for processing (step 1014). If additional names are present, the process returns to step 1006. Otherwise, the process terminates.

With reference again to step 1008, if the monitor identified by the monitor name is not enabled, the process proceeds to step 1014.

With reference again to step 1002, if an input file does not exist, the process terminates.

Figure 11:
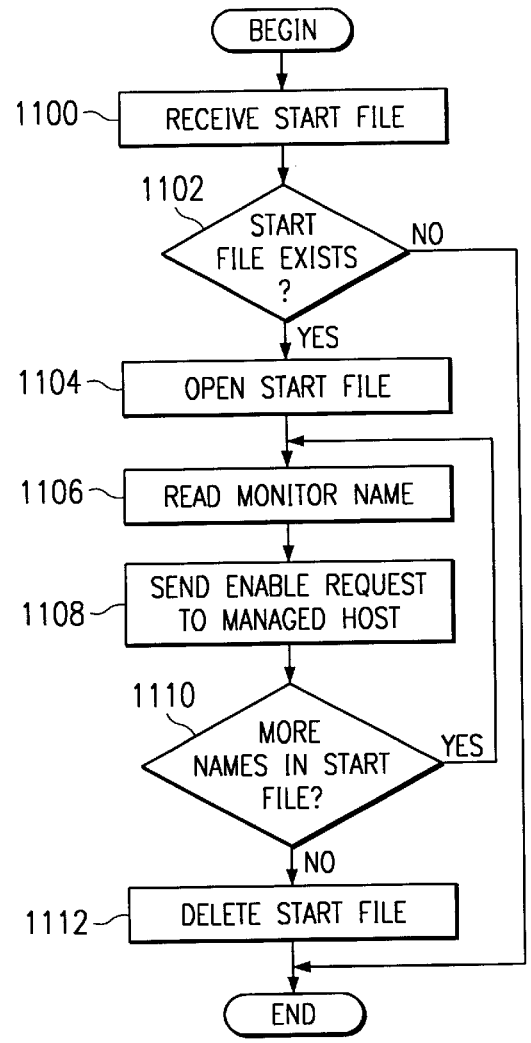
FIG. 11 is a flowchart of a process for a task to start stopped monitors depicted in accordance with a preferred embodiment of the present invention.

Turning now to FIG. 11, a flowchart of a process for starting stopped tasks is depicted in accordance with a preferred embodiment of the present invention. The process begins by receiving an identification of a start file (step 1100). A determination is then made as to whether the start file exists (step 1102). This start file is one in which monitor names for stopped monitors were written as described in FIG. 10 (step 1010).

If a start file exists, the start file is opened (step 1104). A monitor name is read from the start file (step 1106). An enable request for the monitor is sent to the managed host where the monitor is enabled and started (step 1108). A determination is then made as to whether more monitor names are present in the start file that are unprocessed (step 1110). If additional names are absent, the start file is deleted (step 1112) and the process terminates. Otherwise, the process returns to step 1106. Turning again to step 1102, if the start file does not exist, the process terminates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the processes of the present invention may be applied to other types of memory shortages in addition to swap space, such as a shortage of random access memory. In addition, the references to DCE and DFS monitors and tasks is for purposes of illustration only. The processes of the present invention may be applied to other monitors and tasks in a distributed computing environment. Further, the executables that are to be stopped/started do not have to be limited to monitors. This method can apply to all executable that can be identified for stopping and starting in one of the appropriate start/stop files. There are limitations when starting of an executable is done from another script or uses input arguments. One could remedy this limitation by specifying a start string in the stop file associated with each of these deviates. Also, the processes of the present invention may be applied to other types of distributed computing environments other than DCE.

Further, the monitors in the depicted examples are stopped in stages in the examples, but depending on the implementation, all functionality of all monitors may be stopped when the initial swap space shortage event is received. Also, other types of monitors may be stopped depending on the implementation and specific monitors may be selected rather than those that fall into a category, such as statistical monitors. Further, a task, Stop_Monitors, which accepts as input a file that contains the names of the monitors to stop would be equivalent to two task as shown in the depicted example. In this manner, monitors and other processes may be stopped in a preferred order until the memory shortage ceases. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for managing memory in a data processing system within the distributed data processing system, the method comprising:
   responsive to detecting a first level of memory shortage on the data processing system, automatically stopping a first set of monitors on the data processing system;
   responsive to detecting a second level of memory shortage on the data processing system, stopping a second set of monitors on the data processing system; and
   responsive to detecting a ceasing of the memory shortage, automatically starting all stopped monitors.

2. The method of claim 1, wherein the first level is an eighty percent use of the memory and the second level is a ninety percent use of the memory.

3. The method of claim 1, wherein the memory is a swap space on the data processing system.

4. The method of claim 1, wherein the first set of monitors is a set of statistical monitors.

5. The method of claim 1 further comprising:
   responsive to detecting a first level of memory shortage on the data processing system, preventing initiation of automated actions on the data processing system.

6. The method of claim 1, wherein the first level is equal to the second level.

7. The method of claim 1, wherein the stopping and ceasing steps are performed on a server computer.

8. A method in a distributed data processing system for managing memory in a data processing system within the distributed data processing system, the method comprising:
   monitoring the data processing system for memory resource usage at another data processing system;
   responsive to detecting a memory shortage in the data processing system, sending a first message to the data processing system to stop monitor on the data processing system to form a set of stopped monitors; and
   responsive to detecting a ceasing of the memory shortage on the data processing system, sending a second message to the data processing system starting the set of stopped monitors.

9. The method of claim 8 further comprising:
   responsive to detecting a memory shortage, preventing initiation of a set processes on the data processing system.

10. The method of claim 8, wherein the memory shortage is a shortage of swap space.

11. The method of claim 8, wherein the memory shortage is detected by receiving events from the data processing system.

12. The method of claim 8, wherein the memory shortage is a first memory shortage and the set of stopped monitors is a first set of stopped monitors and further comprising:
   responsive to detecting a second memory shortage, sending a third message to stop additional monitors to form a second set of stopped monitors.

13. The method of claim 12, wherein the second message starts the second set of stopped monitors.

14. The method of claim 12, wherein the memory shortage is a shortage of swap space.

15. The method of claim 12, wherein the first memory shortage occurs when a first amount of memory is used and the second memory shortage occurs when a second amount of memory is used.

16. A distributed data processing system comprising:
   a network;
   a plurality of computers, wherein each of the plurality of computers includes memory resources; and
   a monitoring computer, wherein the monitoring computer monitors for memory resource shortages on the plurality of computers, automatically stops execution of a first set of monitors on a computer in the plurality of computers in response to detecting a first level of memory resource shortage on the computer, stops execution of a second set of monitors on the computer in response to detecting a second level of memory resource shortage on the computer, and automatically starts all stopped monitors in response to detecting a ceasing of the memory resource shortage on the computer.

17. The distributed data processing system of claim 16, wherein the memory resources is swap space.

18. The distributed data processing system of claim 16, wherein the first set of monitors is a set of statistical monitors.

19. A distributed data processing system for managing memory in a data processing system within the distributed data processing system, the distributed data processing system comprising:
   first stopping means, responsive to detecting a first level of memory shortage on the data processing system, for automatically stopping a first set of monitors on the data processing system;
   second stopping means, responsive to detecting a second level of memory shortage on the data processing system, for stopping a second set of monitors on the data processing system; and
   starting means, responsive to detecting a ceasing of the memory shortage, for automatically starting all stopped monitors.

20. The distributed data processing system of claim 19, wherein the first level is an eighty percent use of the memory and the second level is a ninety percent use of the memory.

21. The distributed data processing system of claim 19, wherein the memory is a swap space on the data processing system.

22. The distributed data processing system of claim 19, wherein the first set of monitors is a set of statistical monitors.

23. The distributed data processing system of claim 19 further comprising:
preventing means, responsive to detecting a first level of memory shortage on the data processing system, for preventing initiation of automated actions on the data processing system.

24. The distributed data processing system of claim 19, wherein the first level is equal to the second level.

25. The distributed data processing system of claim 19, wherein the stopping means and ceasing means are performed on a server computer.

26. A distributed data processing system for managing memory in a data processing system within the distributed data processing system, the distributed data processing system comprising:
monitoring means for monitoring the data processing system for memory resource usage at another data processing system;
first sending means, responsive to detecting a memory shortage in the data processing system, for sending a first message to the data processing system to stop monitors on the data processing system to form a set of stopped monitors; and
second sending means, responsive to detecting a ceasing of the memory shortage on the data processing system, for sending a second message to the data processing system starting the set of stopped monitors.

27. The distributed data processing system of claim 26 further comprising:
preventing means, responsive to detecting a memory shortage, for preventing initiation of a set processes on the data processing system.

28. The distributed data processing system of claim 26, wherein the memory shortage is a shortage of swap space.

29. The distributed data processing system of claim 26, wherein the memory shortage is detected by receiving events from the data processing system.

30. The distributed data processing system of claim 26, wherein the memory shortage is a first memory shortage and the set of stopped monitors is a first set of stopped monitors and further comprising:
sending means, responsive to detecting a second memory shortage, for sending a third message to stop additional monitors to form a second set of stopped monitors.

31. The distributed data processing system of claim 30, wherein the second message starts the second set of stopped monitors.

32. The distributed data processing system of claim 30, wherein the memory shortage is a shortage of swap space.

33. The distributed data processing system of claim 30, wherein the first memory shortage occurs when a first amount of memory is used and the second memory shortage occurs when a second amount of memory is used.

34. A computer program product in a compute readable medium for managing memory in a data processing system, the computer program product comprising:
first instructions, responsive to detecting a first level of memory shortage on the data process system, for automatically stopping a first set of monitors on the data processing system;
second instructions, responsive to detecting a second level of memory shortage on the data processing system, for stopping a second set of monitors on the data processing system; and
third instructions, responsive to detecting a ceasing of the memory shortages, for automatically starting all stopped monitors.

35. A computer program product in a computer readable medium for managing memory in a data processing system, the computer program product comprising:
first instructions for monitoring the data processing system for memory resource usage at another data processing system;
second instructions, responsive to detecting a memory shortage in the data processing system, for sending a first message to the data processing system to stop monitors on the data processing system to form a set of stopped monitors; and
third instructions, responsive to detecting a ceasing of the memory shortage on the data processing system, for sending a second message to the data processing system starting the set of stopped monitors.

36. A method in a distributed data processing system for managing memory in a data processing system, the method comprising:
responsive to detecting a memory shortage on the data processing system, selectively stopping monitors from a set of monitors on the data processing system in a predetermined sequence; and
performing the stopping step until the memory shortage ceases.

37. The method of claim 36 further comprising:
responsive to a ceasing of the memory shortage, automatically starting all stop monitors.

38. The method of claim 36, wherein the memory is a swap file.

39. The method of claim 36, wherein the memory is a random access memory on the data processing system.

40. A distributed data processing system for managing memory in a data processing system, the method comprising:
stopping means, responsive to detecting a memory shortage on the data processing system, for selectively stopping monitors from a set of monitors on the data processing system in a predetermined sequence; and
performing means for reinitiating the stopping means until the memory shortage ceases.

41. The distributed data processing system of claim 40 further comprising:
starting means, responsive to a ceasing of the memory shortage, for automatically starting all stopped monitors.

42. The method of claim 40, wherein the memory is a swap file.

43. The method of claim 40, wherein the memory is a random access memory on the data processing system.

44. A computer program product in a computer readable medium for use in a distributed data processing system for managing memory in a data processing system, the computer program product comprising:
first instructions, responsive to detecting a memory shortage on the data processing system, for selectively stopping monitors from a set of monitors on the data processing system in a predetermined sequence; and
second instructions for reinitiating execution of the first instructions until the memory shortage ceases.

* * * * *

UNITED STATES PATENT AND TRADEMARK OFFICE
CERTIFICATE OF CORRECTION

PATENT NO. : 6,519,637 B1
DATED : February 11, 2003
INVENTOR(S) : Arkeketa et al.

It is certified that error appears in the above-identified patent and that said Letters Patent is hereby corrected as shown below:

Column 12,
Line 3, after "stop", delete "monitor" and insert -- monitors --.

Column 13,
Line 63, after "in a", delete "compute" and insert -- computer --.
Line 67, after "data", delete "process" and insert -- processing --.

Signed and Sealed this

Sixteenth Day of September, 2003

JAMES E. ROGAN
*Director of the United States Patent and Trademark Office*